United States Patent Office 3,004,352
Patented Oct. 17, 1961

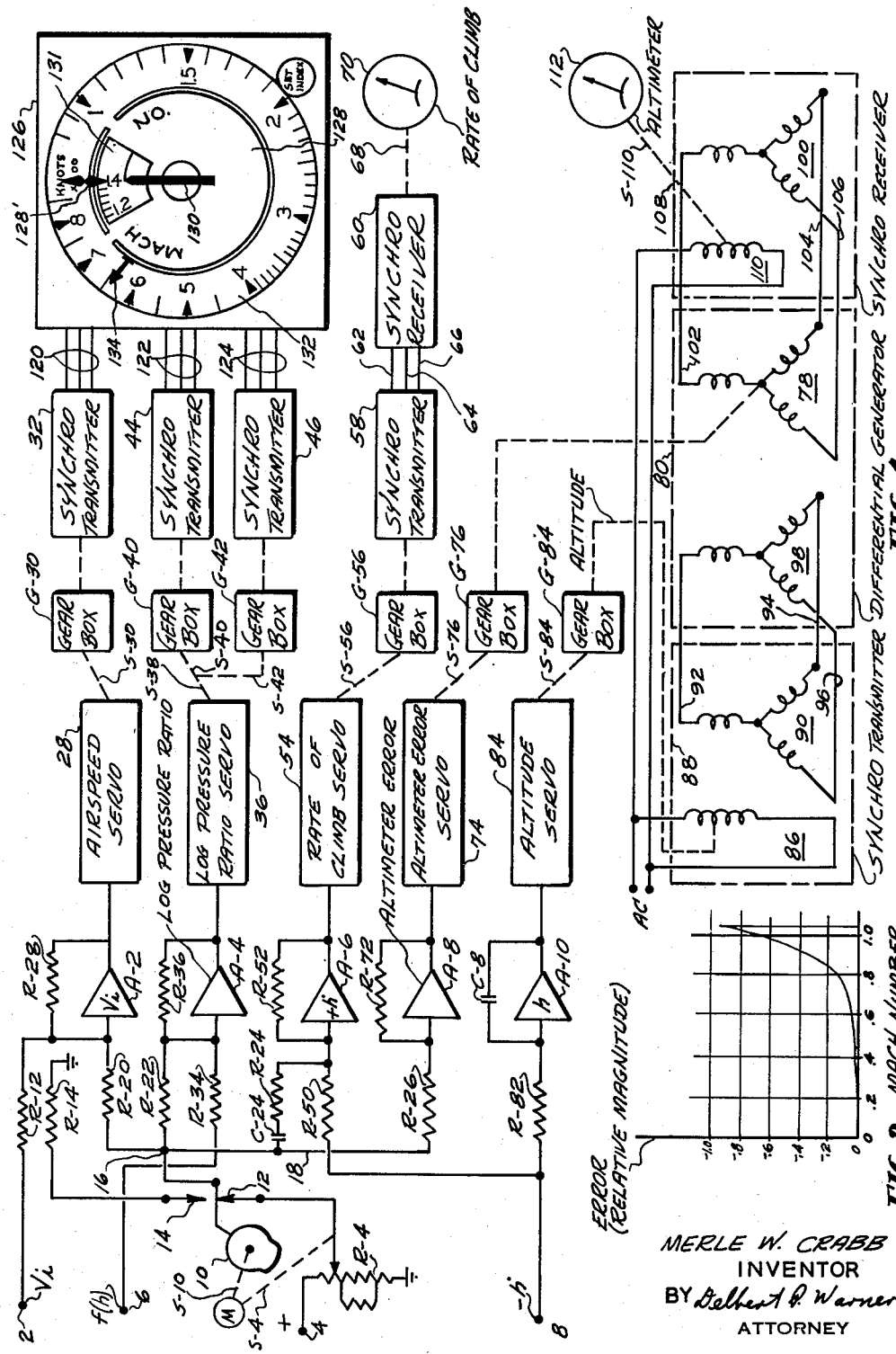

3,004,352
SIMULATION OF ERRORS OCCURRING AT TRANSONIC SPEEDS IN PITOT-STATIC INSTRUMENTS
Merle W. Crabb, Endicott, N.Y., assignor to General Precision, Inc., a corporation of Delaware
Filed Apr. 9, 1959, Ser. No. 805,272
1 Claim. (Cl. 35—12)

This invention relates to the accurate simulation of errors in aircraft instruments and more particularly to the simulation of the errors which occur in Pitot-static instruments moving at transonic speeds.

Pitot-static instruments are used in aircraft to operate indicators which show the relative speed of the aircraft with respect to the air. The principal quantity thus determined is commonly called indicated air speed, and it is an accurate measure of airspeed only to the extent that the elements employed are accurate, the effects of certain variable quantities are correctly determined, and the components of the instrument system have been correctly employed. Since it is impossible, or at least impractical, to place the Pitot-static element completely free of the aircraft's influence on the surrounding air, such factors as compression of the immediate atmosphere and packing of air around the static vent due to the motion of the aircraft have an important influence on the readings of the pressure sensitive instruments.

One of the most important instrument errors in transonic flight is the static-pressure error which increases rapidly with increasing speed up to Mach 1 and then decreases abruptly. Compensation for this error is difficult, since the basic cause of the error appears to be the change in the density of the air which strikes the sensing portions of the instrument—a sort of packing or piling up of air occurring to block the static orifice in particular. This condition is relieved at slightly supersonic speeds when the bow wave crosses the static pressure orifices.

No simple means of correcting for static-pressure error has been devised, and aircraft instruments generally continue to have this error. In aircraft trainers it is highly desirable to simulate all of the characteristics of the instruments which appear in aircraft, including the errors. No attempt has been made to simulate the static pressure error in the prior art.

It is a primary object of this invention, therefore, to provide means in an aircraft trainer to simulate the effects on Pitot-static instruments of flight in the transonic regions.

It is a further object of this invention to simulate the errors in the instruments in an aircraft resulting from flight in the transonic regions.

It is yet a further object of this invention to simulate the errors in airspeed indicators, altimeters, rate of climb indicators and Mach number indicators of an aircraft as it approaches Mach 1, and to simulate the abrupt change which occurs in the errors when the aircraft exceeds that speed by a small amount.

It is yet another object of this invention to simulate the effect of the static pressure error on aircraft instruments.

The novel features that I consider characteristic of my invention are set forth with particularity in the appended claim. The invention itself, however, both as to its organization and its method of operation, together with additional objects and advantages thereof, will best be understood from the following description of specific embodiments when read in connection with the accompanying drawings, in which:

FIG. 1 illustrates a preferred embodiment of the invention in schematic form, and FIG. 2 is a graph depicting static-pressure error.

The invention provides means for simulating errors which occur in aircraft instruments due to changes in the relationships between aircraft and their environment. More specifically, it makes possible the simulation of the static-pressure error which occurs at transonic speeds in the sensing elements of Pitot-static instruments. In order to provide this simulation, a function generator is used to generate a potential proportional to the error as a function of Mach number and altitude. For purposes of explanation, in FIG. 1 a single potentiometer is shown and in FIG. 2 the error has been plotted as a function of Mach number only. This error is applied through suitable connections to computing means for generating signals to operate indicators.

Turning now to FIG. 1 for a more detailed description of this invention, it will be observed that a plurality of input voltages are supplied to terminals 2, 4, 6 and 8. These voltages are proportional to certain computed functions with the exception of that applied to terminal 4, which may be derived from conventional aircraft simulators. The value $V_1$ on terminal 2 represents indicated airspeed, the plus sign on terminal 4 indicates simply that a direct voltage of positive polarity has been applied thereon, the symbol $f(h)$ on terminal 6 represents a function of altitude, and the symbol $-\dot{h}$ represents rate of change of altitude or the rate of climb.

The positive potential supplied to terminal 4 is applied through a potentiometer R-4 which is wound in such a way that the output from the wiper arm sweeping across said potentiometer will be determined in accordance with the curve in FIG. 2. The position of the wiper arm on potentiometer R-4 is determined by a shaft S-4 in accordance with Mach number from zero to a value slightly above Mach 1, at which point the cam 10 will move into position to open the switch contact 12 and close the contact 14. Contact 14 is connected to ground by way of a resistor R-14 and is intended to present a zero signal to terminal 16 when the shafts S-4 and S-10 are so activated by the Mach number servo (indicated at M) as to indicate the aircraft speed is in excess of Mach 1 according to the curve in FIG. 2. It will be appreciated that additional components may be added to the circuit at R-4 to take into account additional errors. An additional potentiometer could be added in parallel along with a suitable summing circuit, for example.

The error signal on terminal 16, from contact 12 or contact 14, is supplied through line 18 and resistors R-20, R-22, R-26, and condenser C-24 coupled to resistor R-24 to the input terminals of amplifiers A-2, A-4, A-6 and A-8. It is apparent that each of these resistors functions as a summing resistor except that the condenser C-24 serves to differentiate the potential transmitted from terminal 16 to the input of amplifier A-6.

Amplifier A-2 serves as a summing amplifier adding the error potential from resistor R-20 to the potential representing indicated air speed from resistor R-12. Amplifier A-2 has a conventional feedback resistor R-28 and applies its output, which is proportional to $V_1$ plus the error signal, to resistor R-28 and to the input terminal of airspeed servo 28 which in turn operates a shaft S-30 through a gear box G-30 to control a generator in block 32 which operates as a synchro transmitter. A synchro transmitter of this kind is conventional and a diagram of such a synchro is illustrated in FIG. 1 at 88 in connection with the altitude servo.

The potential appearing on terminal 6 is a function of altitude labelled $f(h)$ and it is supplied through a resistor R-34 along with the error signal appearing on R-22 to the input terminal of the amplifier A-4. This amplifier A-4 is identified as the log pressure ratio amplifier and presents an output proportional thereto, plus the error from terminal 16, to the feedback resistor R-36 and the log pressure ratio servo illustrated as the block diagram 36. The output of the log pressure ratio servo 36 is fed by shaft position through shafts S-38, S-40 and S-42 and gear boxes G-40 and G-42 to synchro transmitters 44 and 46.

The input on terminal 8 proportional to the rate of change of altitude is supplied through a resistor R-50 to the input terminal of the amplifier A-6. The value of $-\dot{h}$ and the error signal as differentiated by condenser C-24 are then summed by the action of the amplifier A-6 and its feedback resistor R-52 to provide an input voltage to the rate of climb servo 54 which turns a shaft S-56 through a gear box G-56 to operate a synchro transmitter 58 which in turn controls the synchro receiver 60 through connecting lines 62, 64 and 66. The synchro receiver 60 is a motor such as that illustrated at 108 in connection with the altimeter servo below and it controls the shaft 68 which may be positioned thereby to operate an indicator such as the rate of climb indicator 70 or to position other equipment in an aircraft simulator.

The error signal appearing on terminal 16 is fed through a resistor R-26 to the altimeter error amplifier A-8 to be amplified by the amplifier A-8, which is stabilized by the feedback resistor R-72. The output of amplifier A-8 is then fed to the altimeter error servo 74 which in turn, through shaft S-76 and gear box G-76, positions the rotor 78 of the differential generator 80.

The potential proportional to rate of change of altitude appearing on terminal 8 is also fed through a resistor R-82 to the input terminal of the integrating amplifier A-10 with a feedback condenser C-8. The output of the amplifier A-10 is then transmitted to the altitude servo 84 which positions the shaft S-84 through the gear box G-84 to operate the rotor 86 of the synchro transmitter 88.

When the rotor 86 of the synchro transmitter 88 is moved by the shaft S-84 from the neutral position, voltages are induced in the stator windings 90 of the synchro transmitter which are transmitted through appropriate connecting lines 92, 94 and 96 of the stator 98 of a differential generator 80. The potential appearing on the windings of the stator 98 then induce a potential in the windings of the rotor 78 which represent the sum or the difference of the function represented by the voltage across the windings of the stator 98 and the function represented by the position of the rotor 78 as determined by the shaft S-76. The resulting voltage appearing in the windings of rotor 78 are connected by lines such as 102, 104, 106 to the stator winding 100 of the synchro receiver 108. In response to the force caused in the rotor 110 by the potential appearing in the windings of the stator 100, the rotor 110 will turn a shaft S-110 to position the altimeter 112 or to provide a shaft position proportional to the altimeter reading for any other purpose.

The outputs of the synchro transmitters 32, 44 and 46 are fed through lines 120, 122 and 124 to three synchro receivers (not shown) mounted in a meter such as that indicated at 126. The synchro receiver connected to the synchro transmitter 32 positions a disk 128 and a pointer 128' about a pivot 130 so that indicated airspeed may be read on a scale 132. The synchro transmitter 44 operates a synchro receiver to position the disk 131 upon which are inscribed numerals indicating Mach number. Synchro transmitter 46 is connected through the lines 124 to a synchro receiver which functions to position the maximum allowable airspeed pointer 134.

It will be appreciated that the gear boxes G-30, G-40 and G-42 in general step down the rate of rotation from servos 28 and 36, and it will be recognized that additional changes in gear ratio are incorporated in the movements of the meter 126 so that suitable motion will be transmitted to each of the indicating mechanisms through a multiple shaft at pivot 130. It will also be recognized that the scale of the indicators on the meter 126 are especially selected so that the desired quantities, i.e., indicated airspeed, Mach number, and maximum allowable airspeed, will be presented. It will be recognized, of course, that indicated airspeed, Mach number and maximum allowable airspeed are all functions of altitude and of the log of the pressure ratio. The scale of the dials, their motion with respect to each other and the motion of the pointers are arranged to account for the non-linear character of the relationship between these quantities.

An example of the relative magnitude of the error which it is a principle purpose of this invention to incorporate into aircraft simulator instruments is shown in FIG. 2. In FIG. 2 an example of the error is plotted against the Mach number with a slowly rising curve from zero to above 0.8 of Mach 1 and then a much steeper rise to a value slightly above Mach 1. After the aircraft exceeds the velocity of Mach 1 by a small amount, depending upon the particular aircraft, the location of the Pitot-static sensing elements and the like, the error due to the piling up or pressurization of air around the sensing elements suddenly drops to zero or nearly so as the bow wave sweeps past the instrument. The curve in FIG. 2 is believed to represent a typical error. The principles of this invention may be applied to correct for other instrument errors.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desired to secure by Letters Patent is:

In an aircraft simulator means for simulating the effect of the error in a Pitot-static instrument that results from motion at transonic speeds comprising, a function generator for providing an error potential proportional to the amount of said error as a function of Mach number, a differential generator including a rotor and a stator, means for positioning the rotor of the differential generator in accordance with said error potential, means for providing a potential proportional to rate of change of altitude as determined in the stimulator, means for integrating said potential proportional to rate of change of altitude to provide a new potential proportional to altitude, a synchro transmitter including a rotor and a stator, means for positioning the rotor of the synchro transmitter in response to said potential proportional to altitude, means coupling the stator of said synchro transmitter to the stator of said differential generator, a synchro receiver including a stator and a rotor, means coupling the rotor of said differential generator to the stator of said synchro receiver to generate a potential across the windings of said stator proportional to the sum of said error and said altitude, a shaft coupled to the rotor of said synchro receiver, said potential across said stator providing a magnetic field to rotate the rotor of said synchro receiver and to position said shaft in accordance with the sum of the altitude and the error being simulated and indicator means coupled to said shaft to show the indicated altitude with the transonic error superimposed.

References Cited in the file of this patent

UNITED STATES PATENTS 2,784,501    Stern et al.            Mar. 12, 1957
2,849,807    Stern et al.            Sept. 2, 1958